P. H. HERBERT.
OPHTHALMIC MOUNTING.
APPLICATION FILED AUG. 1, 1917.
1,302,548.
Patented May 6, 1919.
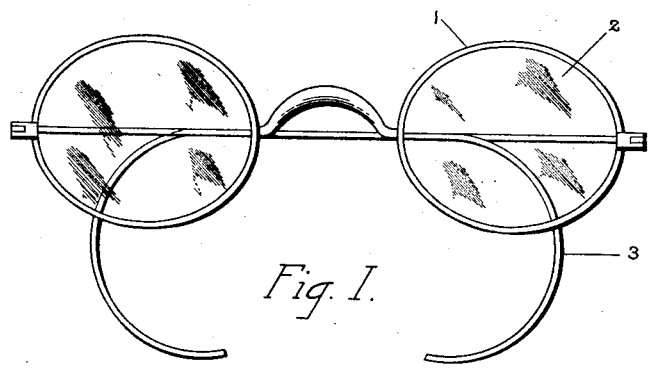
Fig. I.
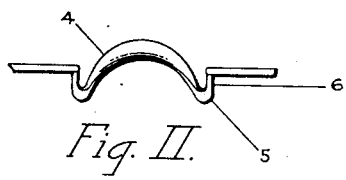
Fig. II.
Fig. III.
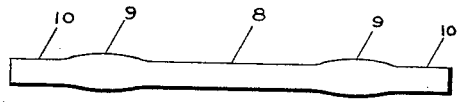
Fig. IV.
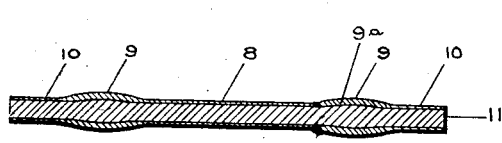
Fig. V.
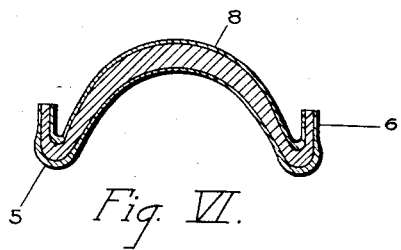
Fig. VI.
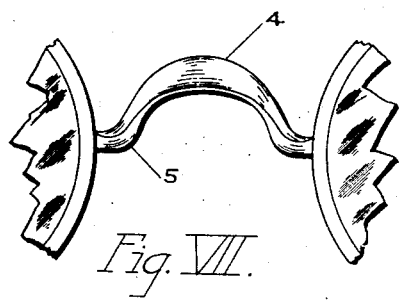
Fig. VII.
INVENTOR
PITT H. HERBERT
BY
H. H. Styll  Hol Parsons
ATTORNEYS

UNITED STATES PATENT OFFICE.

PITT H. HERBERT, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,302,548.     Specification of Letters Patent.     Patented May 6, 1919.

Application filed August 1, 1917. Serial No. 183,950.

*To all whom it may concern:*

Be it known that I, PITT H. HERBERT, a citizen of the United States, residing at Southbridge, in the county of Worcester and State of Massachusetts, have invented certain new and useful Improvements in Ophthalmic Mountings, of which the following is a specification.

This invention relates to improvements in ophthalmic mountings and has particular reference to the center or bridging member of such mountings.

The leading and principal object of the present invention is the provision of a novel and improved manner of so constructing a spectacle bridge or other fitting for an ophthalmic mounting that the fitting shall have a reinforcement at the portion subject to greatest wear tending to make the wear of the mounting as an entirety more uniform.

A further object of the invention is the provision of an improved construction particularly adapted for use in connection with filled metals, which will provide an increased thickness of the outer or precious metal shell of the filled material at the greatest wearing points.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a mounting embodying my improvement.

Fig. II represents a plan view thereof.

Fig. III represents a plan of the blank in its initial stage.

Fig. IV represents a similar view of the blank in condition for forming.

Fig. V represents a longitudinal sectional view of the construction shown in Fig. IV.

Fig. VI represents a horizontal sectional view through the former bridge.

Fig. VII represents a front view of a different bridge.

In the drawings, in which similar characters of reference are employed to denote corresponding parts throughout the several views, the numeral 1 denotes the frames adapted to contain the lenses 2 provided at their outer ends with the temple or ear engaging members 3 for retaining the mounting on the face and being centrally connected by my improved bridge member. This improved bridge member is preferably of the saddle type, comprising the arched portion 4 to fit the nose, terminating in the bends 5 having the forwardly extending arms 6 which are attached to the frames 1 or to suitable lens attachments.

In connection with the spectacle mounting it has been found in the past that the greatest wear on the mounting ordinarily occurs at the points of the bends 5 and that it is, therefore, desirable, particularly in the case of filled material or material having a base metal core and precious metal shell thereon, to reinforce said material at the points 5. This in the past has been accomplished in various manners, as by the securing of patches or the like on the bridge and subsequently reducing the several parts, and in other similar ways.

It is the purpose of my present invention, however, to provide a construction which may be formed up from an ordinary strip of material without the use of any separate parts whatever, but which will possess the desired reinforcement when required. In the accomplishment of this I preferably take a blank such as 7, centrally reduce it as at 8, leaving or forming during this operation the enlargements 9, which preferably terminate in additionally reduced portions 10, although this latter feature is not necessary in that the portions 10 may be left enlarged if preferred.

The great advantage of the formation of these enlargements should be clearly understood by reference to Figs. V and VI, in which it will be seen that at the points of these enlargements the precious metal shell 9ª is much thicker than the shell at the point 8 or 10, this being due both to the fact that the shell was originally thick and was thinned down during the reducing operation in producing the portions 8 and 10, and also to the fact that if the shell were at all softer than the base metal core 11 there would be a tendency during the reducing operation to crowd along the surface of the precious metal as the core is thinned down, while this crowded along material would naturally come to rest at the points 9 and aid in increasing the thickness of the precious metal at these points.

It will then be seen that it is merely necessary to form the bends 5 under metal the length of the portions 9 when the desired reinforcement will be provided.

While I have particularly illustrated this improvement as employed with a saddle bridge, it is equally applicable in the case of a C bridge, frame, temple or other part of an ophthalmic mounting where it is desired to obtain specially reinforced coating at any particular point.

I claim:

1. The process of forming a reinforced spectacle bridge, consisting in centrally and terminally reducing a blank to provide intermediate enlargements thereon and forming the bridge to present the enlargements at the points subject to greatest wear.

2. The process of forming a fitting for an ophthalmic mounting, consisting in reducing a portion only of the blank, whereby unreduced enlargements are provided on the blank, and subsequently shaping the blank to present the enlargements at the points subject to greatest wear.

3. The process of forming an ophthalmic fitting, consisting in reducing a blank of filled material unequally, whereby enlargements are formed thereon, the reduction being in the direction of the enlargements to cause the surface flow of the incasing shell to build up the thickness of shell on the enlarged portions.

In testimony whereof I have affixed my signature, in presence of two witnesses.

PITT H. HERBERT.

Witnesses:
ESTHER M. LAFLER,
H. K. PARSONS.

Copies of this patent may be obtained for five cents each, by addressing the "Commissioner of Patents, Washington, D. C."